June 8, 1965 W. O. BAKER 3,187,898
AUTOMATIC SPIN FILTER
Filed Dec. 26, 1962 2 Sheets-Sheet 1

INVENTOR.
WILLIAM O. BAKER
BY
Flam and Flam
ATTORNEYS.

June 8, 1965 W. O. BAKER 3,187,898
AUTOMATIC SPIN FILTER
Filed Dec. 26, 1962 2 Sheets-Sheet 2

INVENTOR.
WILLIAM O. BAKER
BY
Flam and Flam
ATTORNEYS.

United States Patent Office 3,187,898
Patented June 8, 1965

3,187,898
AUTOMATIC SPIN FILTER
William O. Baker, West Covina, Calif., assignor to Swimquip, Inc., El Monte, Calif., a corporation of California
Filed Dec. 26, 1962, Ser. No. 246,993
2 Claims. (Cl. 210—331)

This invention relates to filters, such as for use in connection with a swimming pool circulation system.

In a diatomaceous earth filter, several circular filter elements are stacked upon a collection tube. Unfiltered water enters the filter tank and reaches the collection tube only through the filter elements coated with diatomaceous earth. In time the diatomaceous earth must be renewed. To facilitate removal of the encrusted material, it has long been the practice rapidly to spin the filter elements in the water filled tank by the aid of an external crank, while opening the waste line.

Erosion removes most of the material. When water of the tank finally runs out of the waste line, the flow of water in the backwash direction follows a course dictated by gravity. Thus, flow in this second backwash phase is concentrated in the lower sectors of the filter. High velocity flow at this time removes the very fine particulate matter as well as any remaining encrusted material. Different sectors of the filter element are subjected to high velocity flow by operation of the crank.

The primary object of this invention is to provide spinning automatically in response to backwashing so that as soon as the valves are operated, manually or otherwise, the filter spins to remove encrusted material during the first backwash phase, and to remove fine particulate matter during the second backwash phase.

Another object of this invention is to provide apparatus of this character that utilizes the motive power of the water itself in achieving a spinning of the filter elements. For this purpose, a turbine runner is incorporated in the collection tube itself, the collection tube being mounted for rotation with the filter elements. Furthermore, the cores of the filter elements are themselves formed as turbine runners. Thus arms of the filter core, instead of extending radially, are formed to deflect the water which courses outwardly in the backwash cycle.

Another object of this invention is to provide apparatus of this character that, during the precoat cycle, produces a slow rotation of the filter elements to promote uniform application of diatomaceous earth material.

Another object of this invention is to provide unique means in the form of an insertable runner, for producing rotation of a collection tube.

Another object of this invention is to provide apparatus for the foregoing purposes which takes no added space in a filter tank, and which introduces no maintenance problem.

This invention possesses many other advantages, and has other objects which may be made more clearly apparent from a consideration of one embodiment of the invention. For this purpose, there is shown a form in the drawings accompanying and forming a part of the present specification, and which drawings, unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings.

Figure 1:
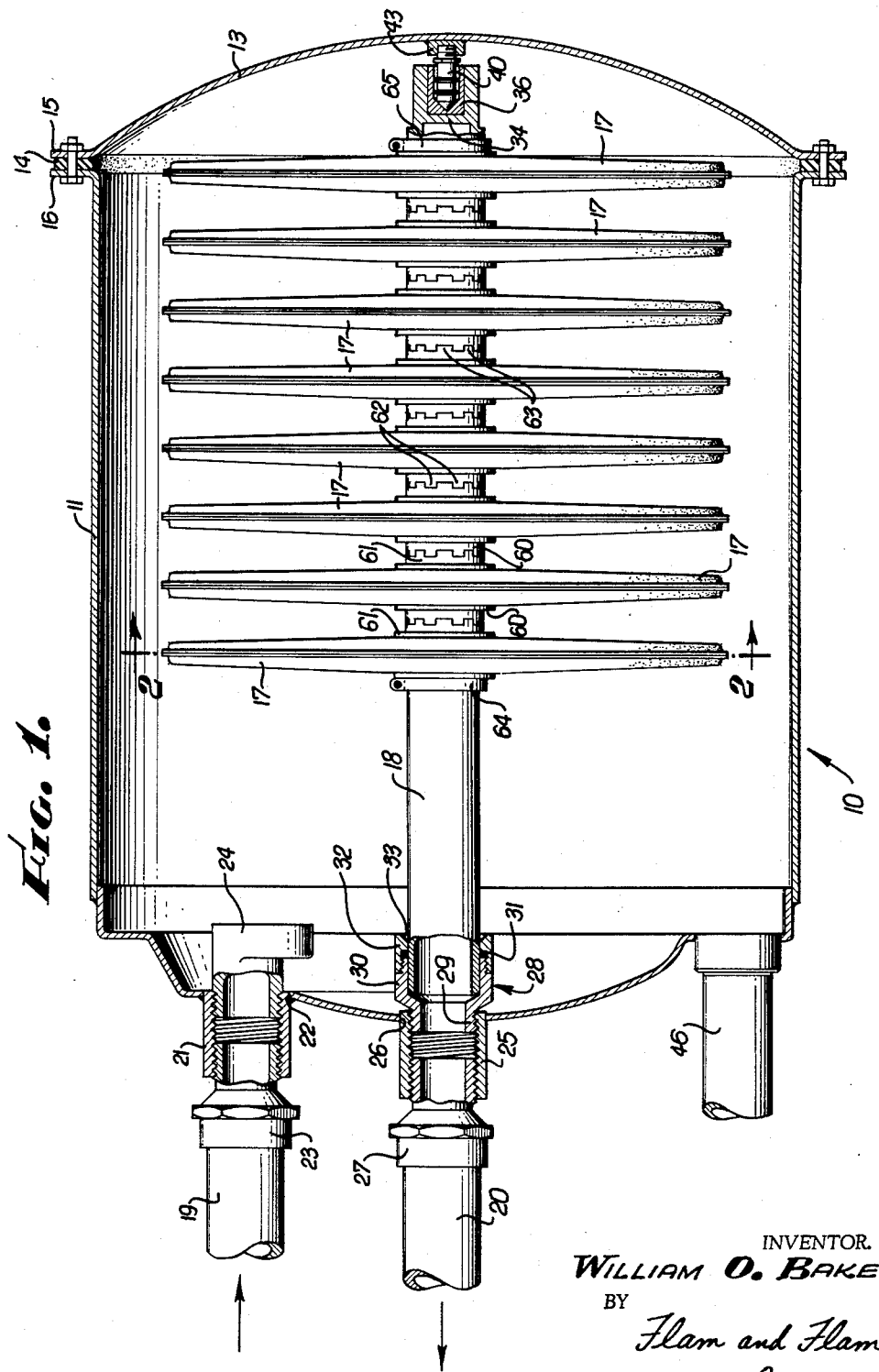
FIGURE 1 is an axial sectional view of the filter incorporating the present invention.

In FIG. 1 there is shown a filter tank 10. The tank proper comprises a generally cylindrical shell 11 and an end wall 12 fitting and welded to one end of the cylindrical shell 11. A detachable lid 13 closes the opposite end of the shell 11. A suitable gasket 14 is interposed between companion flanges 15 and 16 of the lid and shell 11 respectively.

Circular filter elements or discs 17 are mounted in side-by-side relationship in the tank 10. A collection tube 18 is provided for mounting the discs 17 and also for receiving the filtered liquid passing into them.

Influent and effluent conduits 19 and 20 cooperate with fittings mounted on the end wall 12 for communication respectively with the interior of the tank 10 and the collection tube 18. An interiorly threaded connector sleeve 21 is welded at an aperture 22 in the end wall 12. An adaptor 23 mounted at the outer end of the connector sleeve is coupled to influent conduit 19. A diverter 24 is mounted on the inside of the connector sleeve 21.

An interiorly threaded connector sleeve 25 (FIG. 5) similar to the connector sleeve 21, is welded at a central aperture 26 of the filter tank wall 12. An adaptor 27 connects the outer end of the coupling sleeve 21 to the effluent conduit 20.

One end of the collection tube 18 is mounted by a bearing structure that is fitted at the inside of the connector sleeve 21. The bearing structure 28 has a reduced extension 29 threadedly received by connector sleeve 25. The enlarged outer portion 30 of the bearing provides a socket telescopically receiving one end of the collection tube 18 to support the collector tube 18 for rotation about its axis. A ring 31 seals the connection between the collection tube 18 and the bearing 30. The ring 31 fits about the collection tube 18 and is clamped against the end edge of the bearing 30 by the aid of a gland nut 32. The end of the gland nut 32 is bevelled as at 33 to form a guide for insertion of the collection tube 18.

Figure 4:
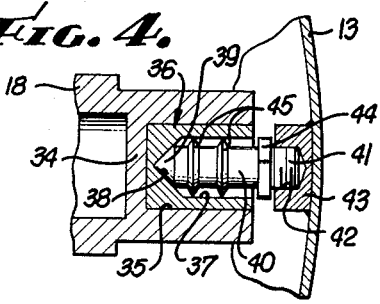

The opposite end of the collection tube 18, as shown in FIG. 4, is closed by a partition 34 that defines the bottom of an end opening recess 35. In the recess 35 is a bearing structure 36, in turn provided with a recess 37. The bottom of the recess 37 is conically formed as at 38 to fit the conical end 39 of a pintle 40 mounted upon the lid 13. The pintle 40 has a threaded end as at 41 that is mounted in the threaded recess 42 of a block 43 welded to the center of the lid 13. A non-circular flange 44 serves as a means for rotating the pintle 40 for achieving suitable engagement with the block 43.

The shank of the pintle 40 has a pair of centering rings 45 that engage, along narrow bands, the cylindrical interior surface of the bearing recess 37. An effective anti-friction support is thus provided for this end of the collection tube.

During the normal running cycle, water enters the influent conduit 19, passes through the diatomaceous earth coating (not shown) on the filter elements 17 to the collection tube 18 and thence to the effluent conduit 20. For backwashing, the flow is reversed, but a waste conduit 46, fitted to the wall 12, is opened. The filter elements are rotated in order completely to remove the coating. During the first backwash phase, while there is water in the tank, erosion removes most of the material. During the second backwash phase, when the tank is empty, concentrated flow removes the fine particulate matter from successive filter sectors as the element is rotated. When backwashing is completed, new diatomaceous earth is introduced into the filter tank, and filter elements are preferably slowly rotated to ensure uniformity of application.

Figure 5:
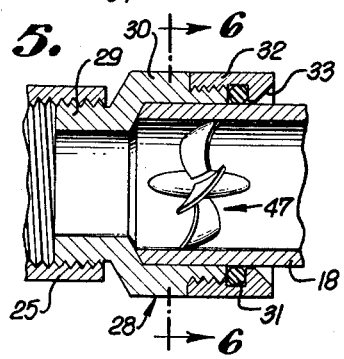
FIGS. 4 and 5 are fragmentary axial sectional views showing the opposite ends of the collection tube.
Figure 6:
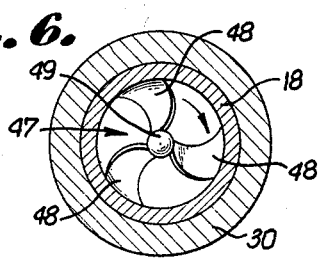
FIG. 6 is a sectional view taken along a plane corresponding to line 6—6 of FIG. 5.

In order to rotate the collection tube 18, it is provided with a runner 47 in the form of propeller blades or vanes fixed within the tube (see FIGS. 5 and 6). The runner 47 in this instance is shown as having three vanes 48 radiating from a central hub 49. The outer edges of the vanes 48 are force fitted to the interior cylindrical surface of the collection tube 18. Other means could be provided to attach the runner 47. The runner 47 is located at the end of the collection tube 18 adjacent the effluent conduit 20 so as to be subject to the total flow through the filter. During normal operation of the filter structure, and during the precoat cycle, the flow to the effluent conduit 20 is moderate, and the torque of the runner 47 produces only a slight rotation. But during the backwash cycle the flow is substantial, and a substantial torque is therefore produced by the runner 47. The result is rotation of the collection tube 18 and the filter elements 17 and removal of material.

In order to supplement the action of the runner 47, each filter element 17 itself is also formed as a runner.

Figure 3:
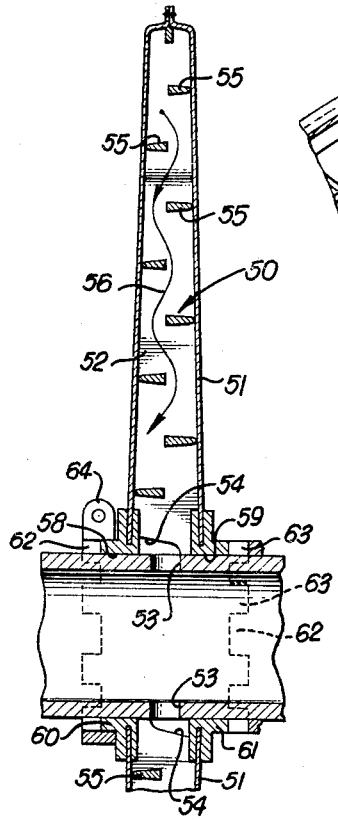
FIG. 3 is a fragmentary sectional view taken along a plane corresponding to line 3—3 of FIG. 2.
Figure 2:
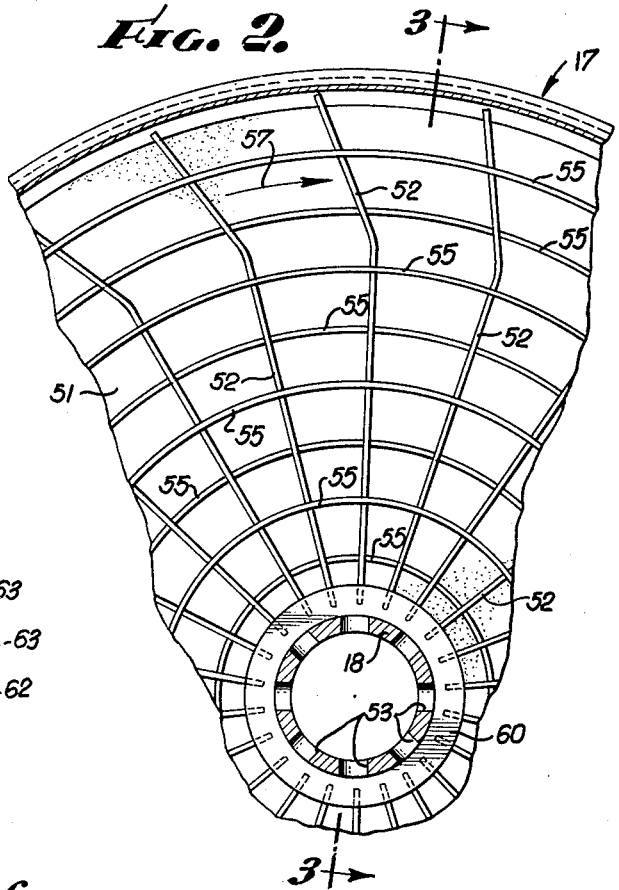
FIG. 2 is a fragmentary enlarged sectional view taken alone a plane corresponding to line 2—2 of FIG. 1.

One of the filter elements is shown in detail in FIGS. 2 and 3. The element includes a molded core 50 and a fabric septum 51 supported by the core 50. The filter element is similar in many respects to the filter element shown and described in the application of Paul D. Prizler, Serial No. 110,390, filed May 16, 1961.

The filter core includes a plurality of radiating arms 52 dividing the core substantially into equal sectors. The inner edges of the arms 52 engage the periphery of the collection tube 18. The tube 18 has a number of sets of circularly arrayed ports, one set for each core. The arms 52 define flow channels between them that lead to the ports 53. The arms 52 at their base ends are relieved, as at 54, so that the actual area of contact with the collection tube falls on one side of the tubes, thereby avoiding any throttling action. The relieved portions 54 of successive arms are located on opposite sides. Two axially spaced areas of engagement with the collection tube result, providing a stable support.

Circularly arrayed webs 55 of the core interconnect the arms 52. Successive webs 55 in each core sector are located on opposite sides of the filter structure, as shown in FIG. 3, first to define an interior channel for flow of water, as indicated by the sinuous arrow 56 in FIG. 3, and second to make it possible for the core to be easily molded in one piece.

The outer ends of the arms 52 are correspondingly angled in a non-radial direction (FIG. 4) so as to form runner blades effective to produce a torque upon the core by virtue of the movement of water toward or away from the collection tube 18.

During the backwash cycle, water entering the collection tube 18 passes radially outwardly through the filter core and impinges upon corresponding sides of the arms. Rotation in the direction of the arrow 57 accordingly results. All of the filter elements 17 are correspondingly oriented on the collection tube 18. During the first backwash phase, most of the arms are operative cumulatively to produce a torque assisting the action of the collection tube runner 47 in rapidly rotating the filter elements. During the second backwash phase, only some of the arms are operative, but rotation results to ensure that successive sectors are subjected to the high velocity flow.

During the normal cycle, the flow of liquid is toward the collection tube 18, and in this instance the water impinges upon the opposite sides of the arms. This torque acting with the torque of tube runner 47 slowly rotates the filter elements 17.

In the present example, the septum plies have central apertures 58 and 59 surrounding the collection tube 18 that are sealed by the aid of plastic hub sections 60 and 61. The hub sections 60 and 61 are molded about the edges forming the apertures 58 and 59. The hub sections in turn fit the collection tube 18. The hub sections 60 and 61 in the present example are provided with teeth 62 and 63 that couple all of the filter elements for rotation in unison. Clamps 64 and 65 couple the filter elements to the tube 18.

The inventor claims:

1. In a filter structure: a filter tank; a filter element comprising an internal core through which filtered liquid flows; a collection tube having a longitudinal axis and mounting the filter element in fixed position on the tube for receiving the filtered liquid therefrom; means mounting said collection tube for rotation of said collection tube with said filter element about the axis of the collection tube; and propeller blade means fixed within the collection tube for imparting rotation to the tube by flow of liquid through the collection tube; said filter element having a core covered by a septum, said core having arms extending away from the axis and having lengths which are angled away from a radial direction for supplementing the torque of said collection tube blade means.

2. In a filter structure: a filter tank; a filter element comprising an internal core through which filtered liquid flows; a collection tube having a longitudinal axis and mounting the filter element in fixed position on the tube for receiving the filtered liquid therefrom; means mounting said collection tube for rotation of said collection tube with said filter element about the axis of the collection tube; and propeller blade means fixed within the collection tube for imparting rotation to the tube by flow of liquid through the collection tube; said core including a plurality of arms radiating from the collection tube, and webs connecting adjacent arms, said arms all correspondingly deviating from a true radial array to form a means for producing a torque for rotating said filter element upon flow of liquid therethrough.

References Cited by the Examiner

UNITED STATES PATENTS

| | | | |
|---|---|---|---|
| 788,511 | 5/05 | Besseberg | 210—354 |
| 2,196,793 | 4/40 | Hall | 210—354 X |
| 2,464,223 | 3/49 | Genter | 210—331 |
| 2,501,924 | 3/50 | Verdoorn et al. | 210—354 |
| 2,530,916 | 11/50 | Stratton | 210—354 |
| 2,593,707 | 4/52 | Walker | 210—331 X |
| 2,672,983 | 3/54 | Blau | 210—354 |
| 2,887,228 | 5/59 | Harlan et al. | 210—108 |
| 2,946,447 | 7/60 | Welz | 210—355 X |
| 3,019,905 | 2/62 | Baker et al. | 210—331 X |

REUBEN FRIEDMAN, *Primary Examiner.*

HERBERT L. MARTIN, *Examiner.*